United States Patent [19]

Humbles et al.

[11] Patent Number: 5,272,277

[45] Date of Patent: Dec. 21, 1993

[54] TELECOMMUNICATIONS WIRING SYSTEM

[75] Inventors: Marion S. Humbles; Marvin L. Humbles, both of Collinsville, Ill.

[73] Assignee: Holscher-Wernig, Inc., St. Louis, Mo.; a part interest

[21] Appl. No.: 603,518

[22] Filed: Oct. 26, 1990

[51] Int. Cl.$^5$ .............................................. H02G 3/00
[52] U.S. Cl. .................................. 174/48; 307/147; 379/397
[58] Field of Search .................... 174/48, 49; 307/147; 379/397, 399

[56] References Cited

U.S. PATENT DOCUMENTS

| | | | |
|---|---|---|---|
| 3,856,981 | 12/1974 | Boundy | 174/48 |
| 4,203,639 | 5/1980 | VandenHoek et al. | 174/49 X |
| 4,214,799 | 7/1980 | Biche | 174/48 X |
| 4,231,630 | 11/1980 | Propst et al. | 174/48 X |
| 4,239,932 | 12/1980 | Textoris et al. | 174/48 |
| 4,377,724 | 3/1983 | Wilson | 174/48 |
| 4,631,881 | 12/1986 | Charman | 174/48 X |
| 4,703,386 | 10/1987 | Speet et al. | 174/49 X |
| 4,792,881 | 12/1988 | Wilson et al. | 312/223 X |
| 4,928,303 | 5/1990 | Allin et al. | 379/397 X |

Primary Examiner—Leo P. Picard
Assistant Examiner—David Tone
Attorney, Agent, or Firm—Kalish & Gilster

[57] ABSTRACT

A telecommunications wiring system reliably provides fast configuration and reconfiguration of user telecommunications devices within a localized telecommunications network. A series of piping assemblies creates a network of pair appearances in multiple. Then, hardwired pair selectors, extractors, are used to connect at least one preselected signal from the piping assembly to the telecommunications device. Since only several of the many signal paths are permanently spliced within the connector of the extractor, only those several paths provide a continuous path for transmission. Whenever the position of a telecommunications device needs to be changed within the network, the extractor associated with the telecommunications device is unplugged from the piping assembly to accompany the telecommunications device to its new location. Then, to complete the reconfiguration of the telecommunications device within the network, the accompanying extractor simply plugs into the piping assembly at the new location and the telecommunications device is plugged once again into the same extractor; thereby, the same, preselected paths are once again utilized. Methodology of providing easily relocatable and reconfigurable telecommunications local system connections between a local termination facility and user telecommunications devices is described accordingly.

9 Claims, 4 Drawing Sheets

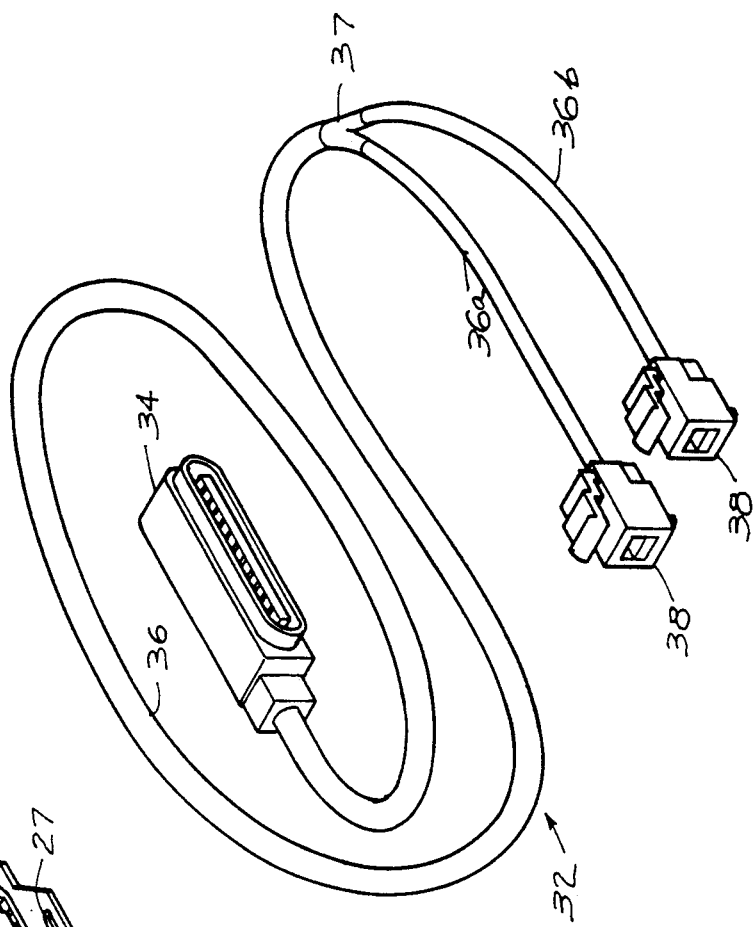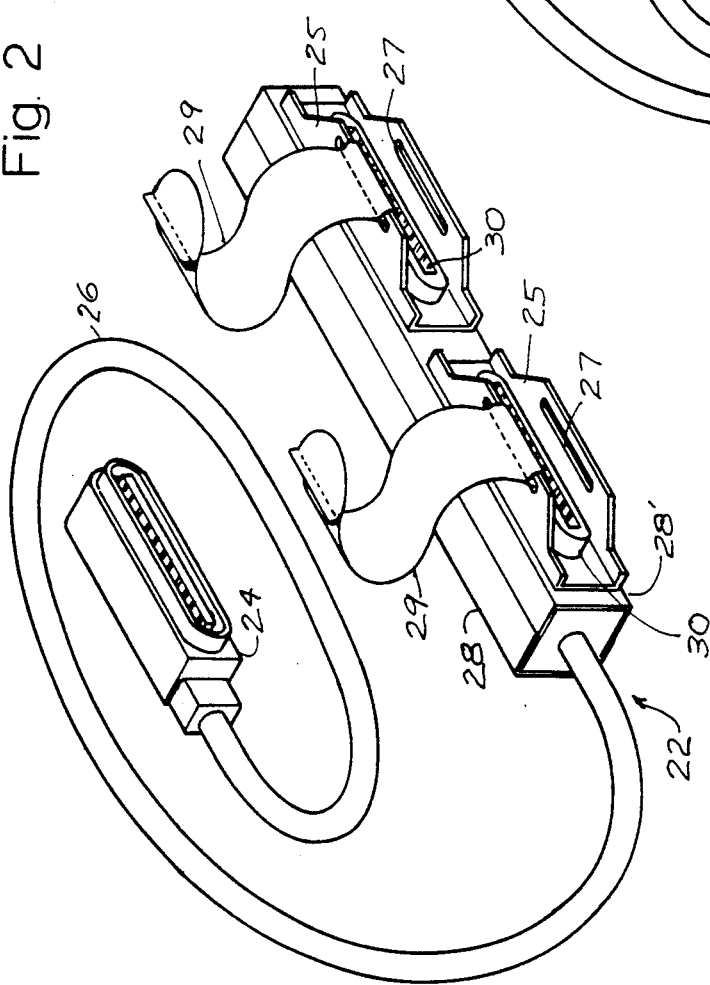

TELECOMMUNICATIONS WIRING SYSTEM

BACKGROUND OF THE INVENTION

This invention relates to telephone and, more particularly, to a telecommunications wiring system for providing quick and reliable reconfiguration of telecommunications devices within a localized geographical area.

As business markets become increasingly global in character, competition has intensified. To nimbly and flexibly respond to rapidly changing market and company needs, businesses have found effective communication and personnel reallocation paramount. Movement of personnel correspondingly creates rapidly changing communication needs requiring reconfiguration of locations of telecommunications devices. In addition, by nature of simply having a great number of employees, government agencies and organizations also have substantial reconfiguration needs. Such reconfiguration often entails use and rearrangement of modular furniture.

Before divestiture, the local telephone company normally was responsible for all telecommunications devices and telephone lines on the customer premises. To change the locations of the telecommunications devices, businesses had no choice but to pay the local telephone company based on a rigid cost schedule. Thus, reconfiguration was an unavoidable cost, a fixed cost. However, since divestiture, individual telephone customers are now responsible for the maintenance of all telecommunications devices and telephone lines on their premises. Thus, instead of being a captive client to a local telephone company, businesses and government may now benefit from competitive market forces driving down the cost of reconfiguration of telecommunications devices.

Heretofore, businesses basically had only three means at their disposal to change the location of a telecommunications device within a localized geographical area. The first method involves physically placing a new telephone line from the punch-down block to the new location. This also involves removing the old line from the punch-down block and placing the new line on the punch-down block. This method requires no change in any cross-connect within the punch-down block. The second method occurs when a physical telephone line is present and unused between the punch-down block and the new location. In this situation, reconfiguration is accomplished by moving a cross-connect in the punch-down block. This second method involves additional administrative tasks in tracking and recording the new distribution pair assignment that has occurred as a result of moving the cross-connect in the punch-down block. The third method entails a combination of the first two. The third possibility, the most expensive, occurs when a new physical line is required to the new location, moving a cross-connect in the punch-down block is required, and administrative record changing is required.

All three methods have commonality in that they require the presence of a trained telecommunications technician. Since divestiture, this cost has fluctuated based on competitive market conditions. These methods require additional skills and present additional difficulties when relocation of telecommunications devices involves the use of modular furniture in which lines must be snaked, or run, through chases of the modular furniture panels.

It is an object of the present invention to provide a telecommunications wiring system of improved simplicity and flexibility, providing commercial advantages and convenience.

It is a further object of the present invention to provide such a telecommunications wiring system which allows even a technically unskilled person to reconfigure the telecommunications network by changing the location of a telecommunications device.

Another object of the present invention is the provision of such a telecommunications wiring system for allowing such an unskilled, untutored person to reconfigure the telecommunications network remarkably faster than the previous method of reconfiguration.

It is a further object of the invention is to provide a system which has relatively few different types of components which are simply and easily installed at a desired location providing sure connection and reliable operation.

It is also an object of the invention to provide such a telecommunications wiring system which is especially advantageous for use with modular furniture panels to permit easy, rapid use and reconfiguration of the system when so used.

Another object of the invention is the provision of a series of piping assemblies for such a telecommunications system, which series comprises a backbone network allowing multiple appearances of the same distribution pair.

It is a further object of the invention to provide such a system having an extractor to provide the path between the piping assembly and the telecommunications device through a permanently preselected distribution pair.

Among still other objects of the invention may be noted the provision of such a system and a method of providing easily relocatable and reconfigurable telecommunications local system connections between a local termination facility and each of a plurality of user telecommunications devices which offers the convenience and flexibility of fast, easy location and relocation of telecommunications devices within a localized geographical area.

Briefly, a telecommunications wiring system according to the present invention provides the capability of flexible configuration and reconfiguration, as for relocation of telecommunications devices within a localized geographical area.

The system provides a physical means from the punch-down block to the localized geographical area, the office area. A network of piping assemblies is attached to the physical means. Each piping assembly provides the capability of creating two distribution pair connections from one feeder pair. Thus, one piping assembly, the feeder assembly, may be connected to two other piping assemblies, the distribution assemblies; whereupon, the two distribution piping assemblies may each become feeder piping assemblies for continuation of the network. Included in this system at different locations are extractors. The extractors provide a permanently hard-wired continuation of a preselected signal path, accomplished by wiring only certain preselected pin positions in a connector. This connector of the extractor is located on one end of a means for cabling such as an inside wire (IW). The other end of the cabling means of the extractor is terminated by a suitable telecommunications device termination, such as an RJ11, or the like. Accordingly, when the change in the location of a particular telecommunications device is required, the extractor which is attached to the telecommunications device is simply unplugged from the piping assembly and replugged into a piping assembly at the new location. Because of multiple in the piping assembly network, the hard-wired, permanent path-selecting extractor immediately provides a telecommunications path to the repositioned telecommunications device on the same distribution pair as the previous location.

Other objects and features will be in part apparent and in part pointed out hereinbelow.

BRIEF DESCRIPTION OF THE DRAWINGS

FIG. 2 is a perspective view of a piping assembly utilized in the system of FIG. 1.

FIG. 3 is a perspective view of the extractor assembly.

Corresponding reference characters indicate corresponding parts throughout the several views of the drawings.

DESCRIPTION OF THE PREFERRED EMBODIMENT

Figure 1:
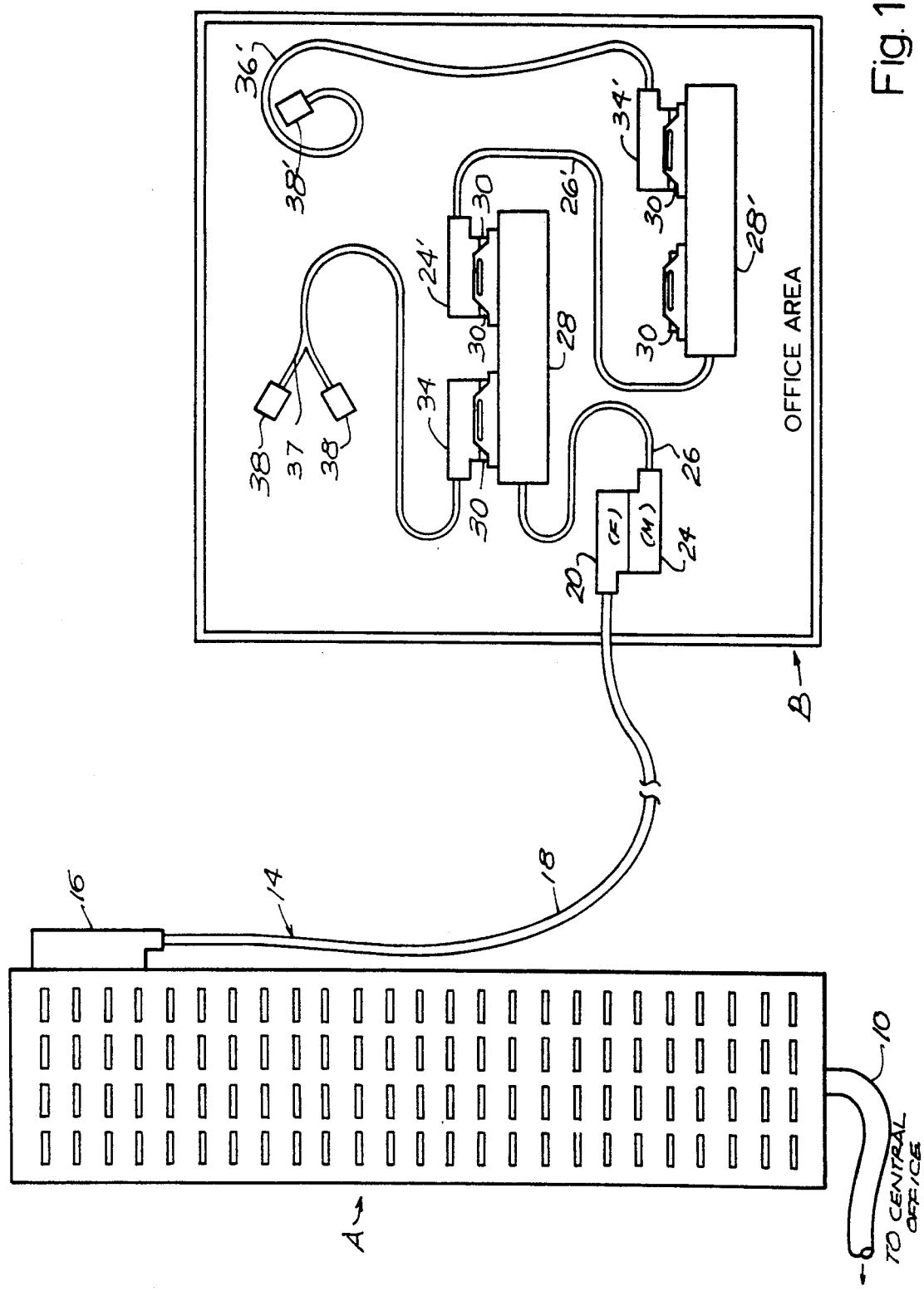
FIG. 1 is a plan view depicting a punch-down block and the path from the punch-down block to the localized geographical area.

Referring now by reference characters to the drawings, there is generally designated at A (FIG. 1) one of various possible types of a telecommunications distribution block where the telecommunications wiring system begins. The central office cable 10 is terminated at a local termination facility, namely punch-down block 12. Central office cable 10 need not be owned by the local telephone company since it may simply be distribution cable from another terminal. A cable is a transmission medium for telecommunications signals whose transmission elements are commonly called "pairs" or "fibers," those skilled in the art recognizing that the cable most often appears in some form of PIC (polyethylene insulated cable), pulp cable (paper insulated cable), or optical fiber cable and an extraordinary variety of standard cable types and sizes exist. For definitional purposes of this patent, IW (inside wire) also fits within the meaning of cable. The punch-down block 12 is generally any terminal suitable for termination. Other terminology for suitable terminals to those skilled in the art include but are not limited to: 66-block, terminal, NCA building terminal, or similar device which provides convenient access to telecommunications signals.

A physical means 14 of providing a path from location A to location B consists of cable 18 with a male/female connector 16 on one end and a male/female connector 20 on the other end. A male/female connector 16 is a male or female connector which provides a termination for a cable to give potential access to each transmission element (such as "pairs" or "fibers"). When the male/female connectors are fully terminated and joined to each other, they provide a continuous path for signal transmission; those skilled in the art recognize that the connectors come in a multitude of standard sizes. The male/female connector 16 may be either male or female depending on the gender of the connector contained within the punch-down block. The male/female connector 20 is generally female. (However, it is noted that the male/female connector 20 may be male. If so, then the male connector 20 may be directly plugged into a piping assembly 22; this sub-optimal design can be examined more fully in FIG. 6.) The illustrated female connector 20 is plugged into the male piping connector 24 of the piping assembly 22. Plugged into the piping assembly hybrid box 28 wherein two female connectors in multiple 30 are located, are another male connector 24' of another piping assembly 22' and a male extractor connector 34 of an extractor assembly 32. Piping 22', being identical to piping assembly 22, includes two female connectors 30 in multiple, thus to receive, for example, the male extractor connector 34' of another extractor assembly 32'. Extractor assemblies 32, 32' are explained below.

Referring to FIG. 2, the piping assembly consists of a piping assembly cable 26 with a male piping connector 24 on one end and a hybrid box 28 on the other end. The hybrid box 28 contains two female connectors in multiple 30. The term "multiple" is known to those skilled in the art as the term which identifies when the "count" of the transmission element is the same, thus indicating more than one possible transmission path. For example, when a feeder cable, X, is joined to two distribution cables, Y and Z, pair (1) of cable (Y) is in multiple with pair (1) of cable Z. Means for quick securement of the connection between the piping assembly and the extractor assembly or another connector assembly is provided in this invention by an external support structure 25 containing slots 27 through which a cooperative hook-and-pile fabric strap 29 is positioned therethrough. It shall be noted that means for quick securement of the connection between the piping assembly and the extractor assembly or another connector assembly can be achieved through a variety of methods, none of which necessarily require attachment to the housing of the hybrid box 28.

Extractor assembly 32 as shown in FIG. 3 consists of an extractor cable 36 with a male extractor connector 34 on one end and at least one extractor termination 38 of female type on the other end at a user location. If, as illustrated, there is more than one extractor termination 38, additional cables 36a and 36b are required for each extractor termination 38. Terminations 38, which may accordingly be in multiple or not, may for example be of 6-pin or 8-pin RJ11 type. Whenever more than one such extractor termination 38 is provided, a splice 37 is required to facilitate the provision of additional cables 36a and 36b. It shall be noted that the number of extractor terminations 38 and the corresponding number of cables, 36a and 36b, is limited only by practicality.

Again referring to FIG. 1, extractor assembly 32', which may be compared with extractor assembly 32, comprises an extractor cable 36' terminated by previously-noted male extractor connector 34' and terminating at a user location exemplarily in a single extractor termination 38' of female gender type (e.g., of 6-pin or 8-pin RJ11 configuration type).

The extractor terminations 38, 38' are each thus known to those skilled in the art as a device which, as an RJ11 (a jack), provides means suitable for connection with a telecommunications device. A telecommunications device as used herein is intended to include but not necessarily be limited to a telephone, fax machine, telephone answering machine, computer, or the like which uses a telecommunications network for signal transmission over a physical path. Male extractor connector 34 of extractor assembly 32 provides access to the plurality of transmission paths that are available in the piping assembly 22. Male extractor connector 34 allows the continuation of only certain preselected transmission paths. The transmission path is defined as signal propagation along transmission elements such as pairs, fibers, connectors or the like.

Figure 4:
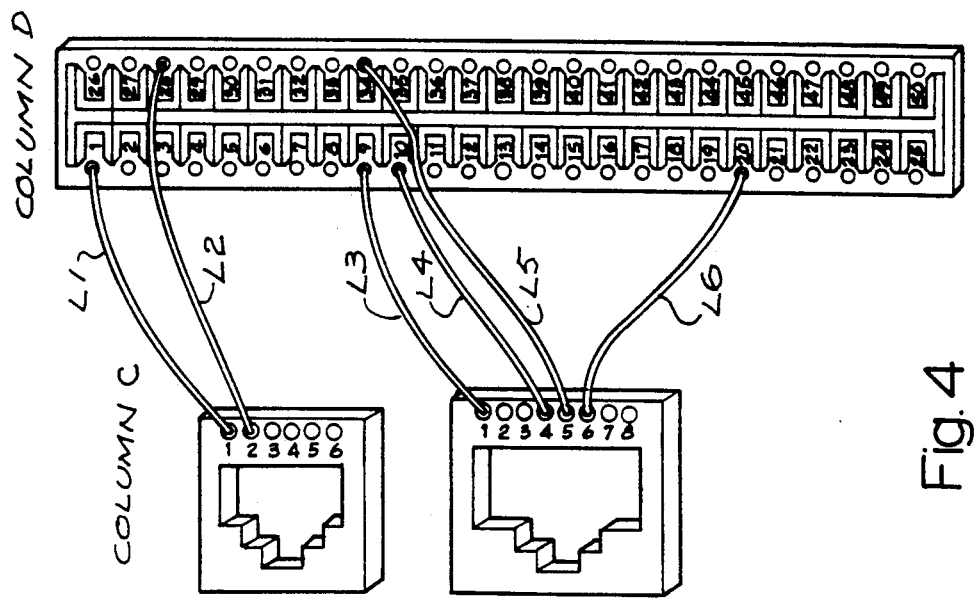
FIG. 4 is a schematic showing possible wiring selections within the extractor assembly of FIG. 3.

Referring to FIG. 4, namely a representative schematic diagram, one possible method of preselecting transmission paths is depicted. Thus, FIG. 4 may be termed a preselection schematic. Column C shows two possible extractor terminations 38 with their corresponding distribution-pair assignment capabilities. Column D illustrates available pair assignments for the male extractor connector 34. Note that the preselection can occur by a variety of different methods, only one of which is shown here and also that the types of extractor terminations and extractor connectors are not limited to the ones illustrated. On this preselection schematic, FIG. 4, the transmission paths are selected by simply drawing a line from one pair position within Column D to a pair position within Column C. These preselected distribution pairs are then hard-wired during manufacture into the male extractor connector 34 to provide permanent distribution pair assignments. Here, the six-pair extractor termination 38 has two permanent distribution pairs assigned from the male extractor connector 34 in Column D. The actual distribution pairs assigned are shown by the lines $L_1$, $L_2$, $L_3$, $L_4$, $L_5$ and $L_6$. In particular, $L_1$ and $L_2$ define distribution pairs 1 and 28 for the first two pair positions respectively in the six-pair extractor termination 38. Similarly, lines $L_3$, $L_4$, $L_5$ and $L_6$ define distribution pairs 9, 10, 20 and 34, respectively, for the 8-pair extractor termination 38. Therefore, whenever an extractor assembly 32 with a wiring schematic as shown in FIG. 4 is unplugged from a piping assembly 22 and subsequently plugged into a different piping assembly 22, which is part of the same piping assembly 22 network but located geographically elsewhere, the extractor assembly 32 will provide a path for signal transmission on exactly the same distribution pairs as in the former location.

Figure 5:
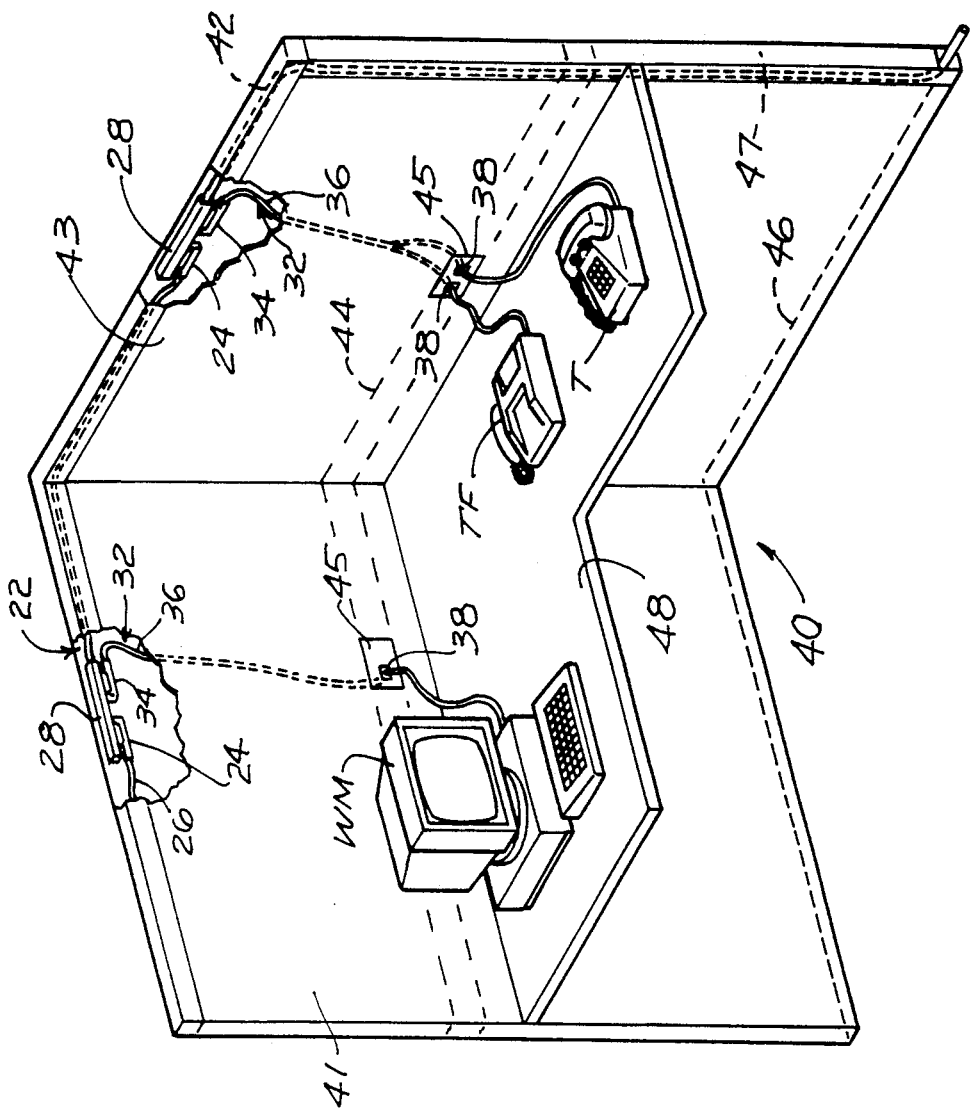
FIG. 5 is a perspective view of one possible wiring configuration for a single office.

FIG. 5 depicts one possible wiring configuration for an individual's office shown generally at 40. Within the individual's office 40 are two modular office panels 41 and 43 which describe table 48. Three telecommunications devices are located on table 48, a telephone T, a telefax TF and a videomonitor VM. Piping assembly cable 26 enters modular office panel 43 and enters vertical chase 47. Upon reaching the top of modular office panel 43, the piping assembly cable 26 enters the high chase 42. Although piping assembly cable 26 is shown within the vertical chase 47 and the high chase 42, it is noted that there are also two other possible chases for placement of piping assembly cable 26. The middle chase 44 and the low chase 46 are also options; however, these are only two other convenient methods for piping assembly cable 26 placement and, obviously, other methods of comparable placement may be utilized. Within the high chase 42, the piping assembly cable 26 enters the hybrid box 28. A male extractor connector 34 of an extractor assembly 32 is plugged into one of two female connectors in multiple 30 which are located within the hybrid box 28 and which are not pictured in FIG. 5. Extending from the male extractor connector 34 is an extractor assembly cable 36 which enters splice 37. Therefrom, cables 36a and 36b emerge, each having an extractor termination 38. Access to the extractor terminations 38 is provided through aperture 45. The other female connector of the two female connectors in multiple 30 within the hybrid box 28 is connected to another piping assembly through male piping connector 24. Piping assembly cable 26 provides the link between male piping connector 24 and the second hybrid box 28. Attached to one of the two female connectors in multiple 30 not shown with the second hybrid box 28 is a second male extractor connector 34 of a second extractor assembly 32. Extending from the second male extractor connector 34 is a second extractor assembly cable 36. Extractor assembly cable 36 is terminated by extractor termination 38. Note that since only one extractor termination 38 was utilized for this particular extractor, a splice 37 followed by a multiplicity of cables was not required. Access to the second extractor termination 38 is provided by a second aperture 45 located within modular office panel 41. Looking again to the second hybrid box 28, a third male piping connector 24 is plugged into the second hybrid box 28 through the remaining female connector of the two female connectors in multiple 30. From the third male piping connector 24 extends a third piping assembly cable 26 which extends to the field.

Figure 6:
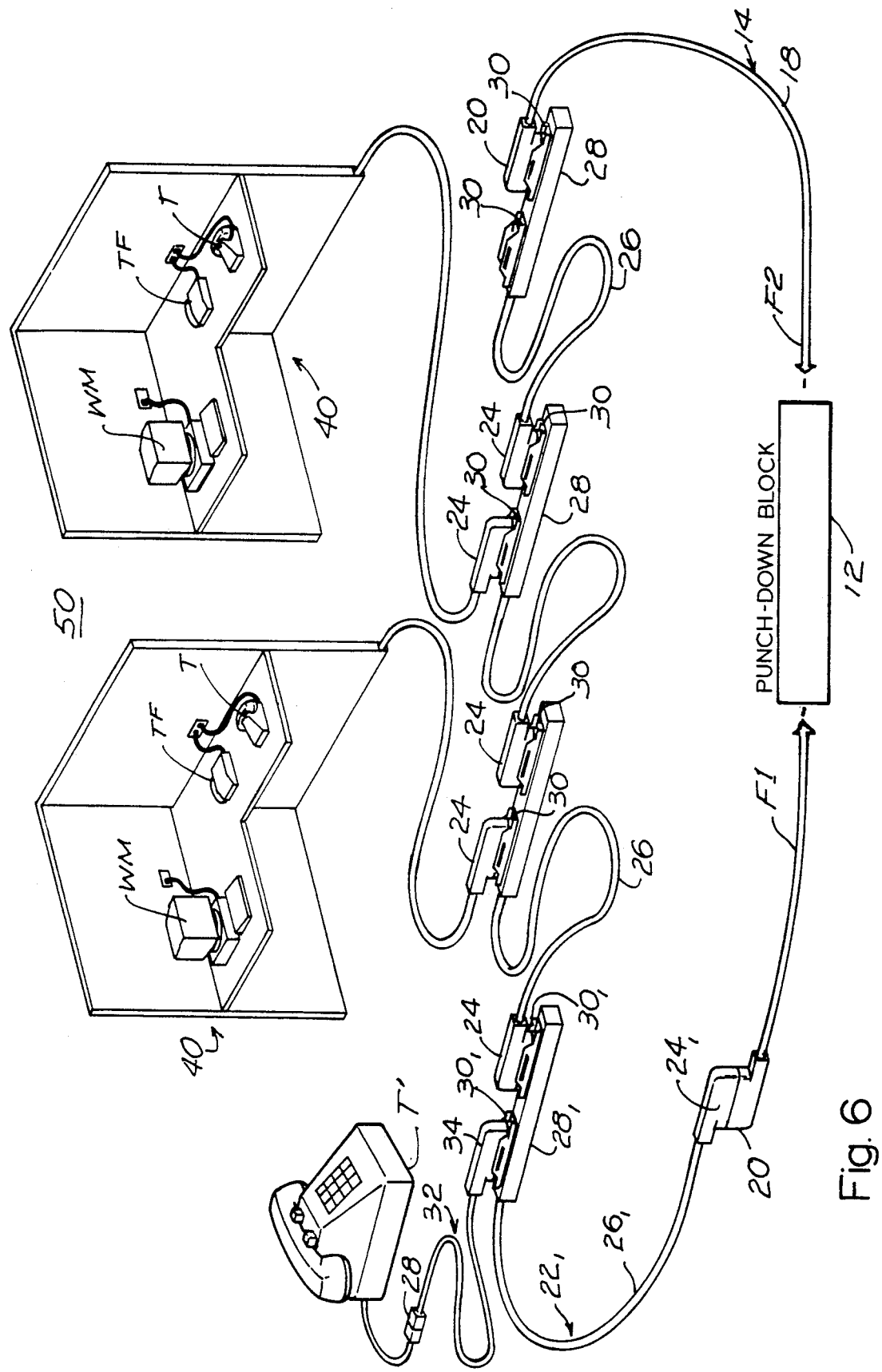
FIG. 6 is a plan view of one possible wiring configuration of a localized geographical area.

Shown in FIG. 6 are expanded network configurations in accordance with the present invention, as used with an office communications system generally designated 50 having a pair of office areas 40 as well as an additional telephone T, as representative of just one of numerous possible variations of configurations of the present system as used with office communications facilities of different types.

Thus, system 50 is shown for connection with the punch-down block which provides the telecommunications wiring pairs for telephone and other communications devices of system 50, by having the system connected to it by use either of a feeder configuration F1 or F2, the selective choice of which will determine the gender sequencing of piping assemblies forming the system. Thus, if the F1 feeder configuration is to be used, it will be understood that one fewer piping assembly 22 may be needed than when employing the network configuration using a feeder F2. That is, if the F2 network configuration is to be employed, a piping assembly $22_1$ will be employed, but if the F1 network configuration is used, piping assembly $22_1$ is not required, it being understood that only one such network configuration F1 or F2 will be selected. The feeder F1 configuration is preferred over the feeder F2 configuration, which is thus a sub-optimal design as referenced earlier in the description of FIG. 1. If then assuming that the feeder F1 configuration is selected and connection made accordingly to punch-down block 12, piping assembly $22_1$ will have its piping assembly $26_1$, as terminated by plug $24_1$, connected to a female connector 20 through which the F1 configuration connections are made to the various circuits of the piping assembly. The piping assembly hybrid box $28_1$ of piping assembly $22_1$ will thus present its two female connectors $30_1$ in multiple, one receiving the extractor connector 34 for connection to telephone T by an extractor cable 36, as terminating in an RJ11-type termination 38 unique to such telephone T', and the other female connector $30_1$ receiving the male piping connector 24 of a next adjacent piping assembly 22, the hybrid box 28 thereof having its female connectors 30 in multiple, one to receive a male connector of the next piping assembly 22, and so on, in seriatum, each such hybrid connector box thus providing one receptacle 30 for receiving the male connector of piping assemblies which provide the communications to each of the work areas 40, as shown.

If instead the feeder F2 connection is employed, piping assembly $22_1$ is not employed, but piping assembly $22_2$ is instead used for providing access to the female connector $30_2$ of its hybrid box $28_2$, and in which connector 30 is received the male connector 20 of a cable 18 by which the F2 connection to the punch-down block 12 provides the communications to the string and complex of piping assemblies, which remain connected just as they did when using the feeder F1 configuration.

By way of simple analogy, an interconnected series or complex of piping assemblies will thus have a terminus provided at opposite ends and, quite possibly also, at other locations along its length, as at nodes resulting from the access of an extra female connector in a hybrid box thereof. Thus, whether connection is made at any such terminus or at such a node, the punch-down block connection uniquely defines the transmission paths properly designated for the preselected distribution pairs of telephones, computers or other equipment which are hard-wired for use in the system and thus properly and uniquely defined telephone numbers or other designations appropriate for individual users or their equipment. As will thus be apparent, a tremendous number of various combinations, expansions and permutational configurations of the present system are possible.

Accordingly, there is seen to be provided a telecommunications wiring system comprising at least one piping assembly including a cable with a connector of a first gender type on one end and at least two connectors of an opposite gender type in multiple on the other end thus providing at least two distribution cables in multiple with the feeder cable, the cable carrying multiple user signals by means of multiple available transmission paths intended for a plurality of user communications devices. One end of the piping assembly is configured for interconnection with a local termination facility offering a plurality of available transmission paths, whereby at least some of the available transmission paths are provided by the piping assembly. At least one extractor assembly is included for permanently providing a continuation of at least one preselected signal path from the plurality of available transmission paths provided by the piping assembly through the extractor assembly to a user telecommunications device. The extractor assembly comprises a cable with an extractor connector of the first gender type on one end and a terminal on the other end for connection of a user telecommunications device corresponding to said preselected signal path, the extractor connector having capability for accessing the plurality of available transmission paths provided by the piping assembly.

The invention thus also involves a method of providing easily relocatable and reconfigurable telecommunications local system connections between a local termination facility and each of a plurality of user telecommunications devices, comprising (a) preselecting signal paths for the user telecommunications devices from a plurality of available transmission paths, (b) providing at least one extractor cable from a possible plurality of such extractor cables, each such extractor cable having a preselected signal path corresponding to a given user telecommunications device, (c) providing a first one from a possible plurality of like telecommunications piping assemblies having opposite ends, one end being adapted for being connected to the local termination facility and the other end being adapted for being interconnected with an extractor cable, and (d) orienting and configuring at least one end of said at least one piping assembly to provide connectors in multiple for permitting a further such piping assembly to be connected to the first piping assembly, and wherein each such piping assembly provides at its ends access to each of the plurality of available transmission paths, whereby each such extractor cable may easily and quickly provide correct continuation of the preselected signal path to a user telecommunications device upon relocation or reconfiguration of local system connections.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A telecommunications wiring system comprising at least one piping assembly including a cable with a connector of a first gender type on one end and at least two connectors of an opposite gender type in multiple on the other end, the cable carrying multiple user signals by means of multiple available transmission paths intended for a plurality of user communications devices, one end of the piping assembly being configured for interconnection with a local termination facility offering a plurality of available transmission paths, whereby at least some of the available transmission paths are provided by the piping assembly and at least one extractor assembly for permanently providing a continuation of at least one preselected signal path from the plurality of available transmission paths provided by the piping assembly through the extractor assembly to a user telecommunications device, the extractor assembly comprising a cable with an extractor connector of the first gender type on one end and a terminal on the other end for connection of a user telecommunications device corresponding to said preselected signal path, the extractor connector having capability for accessing the plurality of available transmission paths provided by the piping assembly, and wherein the at least two connectors of an opposite gender type in multiple can mate with both the connector of first gender type of the extractor assembly and the connector of first gender type of another such piping assembly.

2. A telecommunications wiring system according to claim 1 in combination with a plurality of office divider panels in an office area, the local termination facility being a punch-down block, means for interconnecting one end of said at least one piping assembly with the punch-down block for communication with the office area, the piping assemblies and extractor assemblies being placed substantially within the office divider panels, the extractor assemblies being associated with corresponding different user telecommunications devices within the office area.

3. A telecommunications wiring system according to claim 2 wherein the first and opposite gender types are respectively male and female, wherein the at least two connectors of an opposite gender type are female gender type connectors in multiple and carried in a hybrid connector box which can be threaded through conventional wiring chases of such office divider panels, and the female connectors in multiple of said hybrid connector box can each mate with both the connector of male gender type and the connector of male gender type of another such piping assembly.

4. A telecommunications wiring system according to claim 3 wherein the hybrid connector box is of thin, relatively elongated configuration which carries two such female type connectors, positioned along at least one surface thereof, the hybrid connector box carrying means for quick securement of male gender type connectors received by each female gender type connector.

5. A telecommunications wiring system according to claim 4 wherein the means for quick securement comprises a hook-and-pile fabric strap to be selectively tightened about a connector so received.

6. A telecommunications wiring system according to claim 5 wherein the means for quick securement has a support structure including a slot for the fabric strap, the strap being secured to itself to be tightened after passing through a slot.

7. A telecommunications wiring system according to claim 1 wherein the first and opposite gender types are respectively male and female.

8. A telecommunications wiring system according to claim 1 further comprising means for quick securement of the connection between the piping assembly and the extractor assembly or another such connector assembly.

9. A method of providing easily relocatable and reconfigurable telecommunications local system connections between a local termination facility and each of a plurality of user telecommunications devices, comprising (a) preselecting signal paths for the user telecommunications devices from a plurality of available transmission paths, (b) providing at least one extractor cable from a possible plurality of such extractor cables, each such extractor cable having a preselected signal path corresponding to a given user telecommunications device, and each such extractor cable being part of an extractor assembly including for the extractor cable an extractor connector of first gender type on one end, (c) providing a first one from a possible plurality of like telecommunications piping assemblies having opposite ends, one end including a connector of first gender type adapted for being connected to the local termination facility and the other end being adapted for being interconnected with an extractor cable, and (d) orienting and configuring at least one end of said at least one piping assembly to provide at least two connectors of an opposite gender type in multiple for permitting a further such piping assembly to be connected to the first piping assembly, and wherein each such piping assembly provides at its ends access to each of the plurality of available transmission paths, such that the at least two connectors of an opposite gender type in multiple can mate with both the connector of first gender type of the extractor assembly and the connector of first gender type of another such piping assembly, whereby each such extractor cable may easily and quickly provide correct continuation of the preselected signal path to a user telecommunications device upon relocation or reconfiguration of local system connections.

* * * * *